(No Model.)

C. C. LARRABEE.
CHAFE IRON FOR VEHICLES.

No. 391,623. Patented Oct. 23, 1888.

Witnesses:
F. L. Middleton.
Walter P. Keene.

Inventor:
Chas. C. Larrabee.
By Ellis Spear,
Atty.

UNITED STATES PATENT OFFICE.

CHARLES C. LARRABEE, OF BATH, MAINE.

CHAFE-IRON FOR VEHICLES.

SPECIFICATION forming part of Letters Patent No. 391,623, dated October 23, 1888.

Application filed February 9, 1888. Serial No. 263,544. (No model.)

*To all whom it may concern:*

Be it known that I, CHARLES C. LARRABEE, of Bath, Maine, have invented certain Improvements in Chafe-Irons for Vehicles, of which the following, taken in connection with the accompanying drawings, is a specification.

This invention relates to "chafe-irons," so called, for wheeled vehicles, in which a roller mounted within a suitable frame receives the friction and thrusts of the wheel in lieu of a rigid fender or plate, as was generally in use prior to the introduction of the roller.

Specifically the invention is an improvement on the device shown and described in my Letters Patent, No. 366,227, of April 20, 1887.

Figure 1:
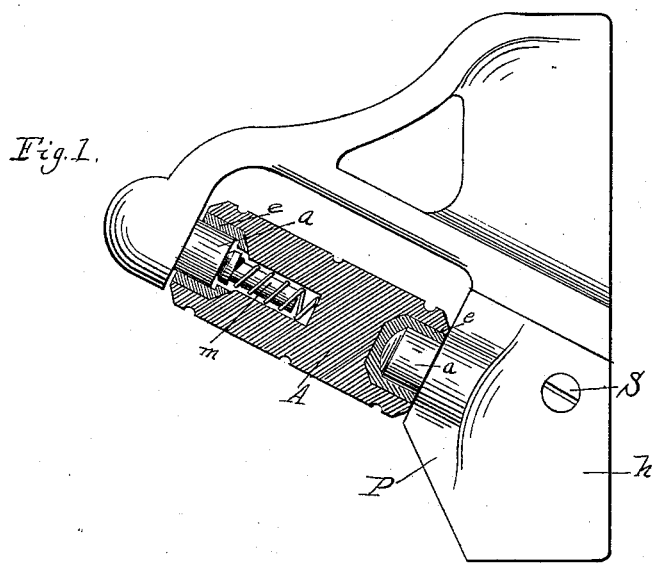
Figure 2:
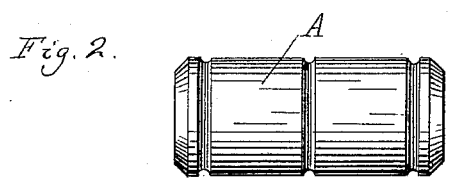
Figure 3:
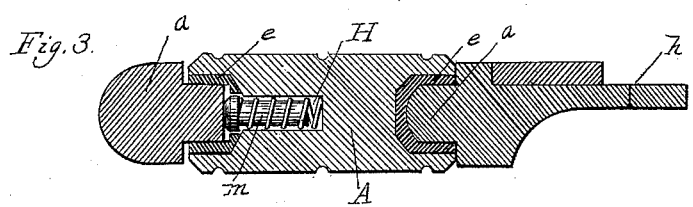
Figure 4:
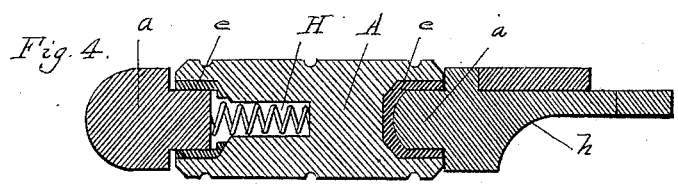

Referring to the drawings, Figure 1 represents the chafe-iron mounted in its supporting-frame, the iron being sectioned to illustrate its supporting-bearings. Fig. 2 is an elevation of the iron or roll detached from its supporting-frame. Fig. 3 is a section on line 3 3. Fig. 4 is a similar view showing a modified form of construction.

For a detailed description of the chafe-iron, its supporting-frame, and its attachment to and use in connection with a vehicle, reference may be had to my said Letters Patent, No. 366,227.

In the use of the device set forth in said application and Letters Patent I have learned that the chafe-iron proper—that is, the roll A—is liable to become set and fixed in its bearings by reason of the corrosion and rusting of the metal of which the device is composed. The usefulness of the roll is diminished whenever the bearings are rusted so as to impede the motion of the roll, and, obviously, when the roll is stuck or set fast in its bearings it becomes a rigid fender, equivalent to the old-fashioned plate.

To prevent the parts from rusting and to obviate the difficulties consequent from such rusting constitutes one of the objects of this invention; and to this end I interpose between the bearing a bushing or film of non-corrosive metal, preferably a bushing of ordinary Babbitt metal. I construct roll A with hollow end journal-sockets to receive the pintles *a a* of the supporting-frame, as shown in Figs. 1, 3, and 4. Said journal-sockets are provided with a bushing, *e*, of the Babbitt or non-corrosive metal, which, being thus interposed between the iron of roll A and the iron of the supporting-pintles *a a*, operate to prevent corrosion and rust and keep the roll in condition to revolve easily. A further advantage is that the bearings, when worn, may be readily renewed by renewing the Babbitt bushing.

I am aware that a cylindrical chafe-iron having a tubular central bore extending throughout its entire length and supported in a frame by means of a bolt or shaft passing through the chafe-iron is not new; but such a device is liable while in use to be twisted or sprung out of its normal condition sufficiently to bend the supporting-bolt, in which condition the chafe-iron is prevented from turning readily. This distortion or abnormal condition of the supporting-bolt may arise and continue only while strained by the bearing-pressure of the wheel upon the chafe-iron; but in some cases the bolt remains distorted after the pressure of the wheel is withdrawn, and in either case the usefulness of the rolling chafe-iron is impeded and diminished, if not entirely destroyed. To obviate such objections is a further object of this invention. It is to that end that I make the roll with short end journal-sockets adapted, as described, to receive the short supporting journal-pins *a a*. Said roll A is provided with a chamber in one end to receive the spring H, whereby the rattling incident to the parts when worn loose is prevented. To that end the spring is made to bear one end against the pintle and its opposite end against the roll A, as shown in Fig. 4, so as thereby to crowd the roll into bearing contact with the opposite journal-pin. To prevent the crowding and bending of said spring, a plunger, *m*, may be used within the spring, as shown in Figs. 1 and 3. The pintle at one end is made a part of the supporting-frame, while that at the opposite end is made in a separate plate, *h*, which is detachably connected with the supporting-frame by means of a rivet, or, preferably, a screw, S, to the end that the roll may be easily adjusted in the supporting-frame and removed therefrom whenever occasion requires it in order to renew the journal-bushings. Said plate *h* is extended and provided with an inclined face, P, against which the wheel is made to bear when the vehicle is unduly tipped over, and is thereby prevented from going off the face of the chafe-iron onto the vehicle proper and becoming cramped in connection therewith. Another advantage is that the said plate $h$, being formed separately from the supporting-frame, may be of exceedingly-hardened material.

Having thus described my invention, I claim as new and desire to secure by Letters Patent—

1. A chafe-iron consisting of the supporting-frame adapted for attachment to the side of the vehicle, said supporting-frame being made in two parts, each part having a pintle formed integral therewith, and a cylindrical roll having a socket at each end adapted to receive said pintle, substantially as described.

2. A chafe-iron consisting of a supporting-frame adapted for attachment to the side of a wagon or other vehicle, a cylindrical chafe-iron chambered at both ends to receive the supporting pintles or journals of said frame, and a spring inclosed within the chafe-iron, acting through its force to crowd the parts together, substantially as described.

3. The combination of the roll or cylindrical chafe-iron chambered at both ends, the supporting-frame formed with pintles integral therewith, and the tire-plate $h$, substantially as described.

4. A chafe-iron consisting of the supporting-iron adapted for attachment to the side of a wagon or other vehicle, a cylindrical chafe-iron supported to turn in said frame, and a bushing or film of non-corrosive metal interposed between the chafe-iron and the supporting-bearings of the frame, substantially as described.

5. A chafe-iron consisting of a supporting-frame, a cylindrical chafe-iron having end sockets to receive projections on the frame, and a bushing of non-corrosive metal, substantially as described.

6. A chafe-iron consisting of a supporting-frame, a cylindrical chafe-iron supported to turn on bearings in said frame, and a bushing or film of Babbitt metal interposed between the chafe-iron and its supporting-bearings, substantially as described.

Executed at Boston, Massachusetts, this 24th day of January, 1888, in presence of witnesses.

CHAS. C. LARRABEE.

Witnesses:
E. E. HAMILL,
C. B. TUTTLE.